United States Patent [19]
Paulus

[11] Patent Number: 5,312,290
[45] Date of Patent: May 17, 1994

[54] TENDERIZER

[76] Inventor: Daniel S. Paulus, 1120 chaussée de Ninove, 1080 Bruxelles, Belgium

[21] Appl. No.: 942,903

[22] Filed: Sep. 10, 1992

[30] Foreign Application Priority Data

Sep. 10, 1991 [BE] Belgium .............................. 09100840

[51] Int. Cl.⁵ .............................................. A22C 9/00
[52] U.S. Cl. ................................................ 452/141
[58] Field of Search ................ 452/141, 144, 146, 147

[56] References Cited

U.S. PATENT DOCUMENTS

| | | | |
|---|---|---|---|
| 1,459,445 | 6/1923 | Elderton et al. | 452/147 |
| 2,109,434 | 2/1938 | Oliver | 452/141 |
| 2,464,634 | 3/1949 | Boettcher | 452/141 |
| 2,537,003 | 1/1951 | Boettcher | 452/141 |
| 3,583,025 | 6/1971 | Jaccard | 452/141 |
| 3,900,918 | 8/1975 | Allinquant et al. | 452/141 |

FOREIGN PATENT DOCUMENTS

| | | |
|---|---|---|
| 667109 | 11/1938 | Fed. Rep. of Germany . |
| 1198470 | 12/1959 | France . |
| 1547443 | 11/1968 | France . |
| 1585702 | 1/1970 | France .................. 452/147 |
| 426537 | 6/1967 | Switzerland . |

Primary Examiner—Willis Little
Attorney, Agent, or Firm—Keck, Mahin & Cate

[57] ABSTRACT

Tenderizer, especially for butchers' meat, comprising: a tray to receive a piece of meat to be tenderized, a movable device (8) having support means (5) for a grid (4) which is intended to immobilize and hold said piece on the tray during the tenderizing operations, and tenderizing knives (2) intended to interact with the abovementioned grid (4) and mounted on a movable support (3), the aforementioned device (8) and the grid (4) which is associated therewith being arranged so that only the face of the grid (4) turned towards the tray comes into contact with the piece of meat, the grid (4) being mounted in a removable manner on the support means (5).

10 Claims, 3 Drawing Sheets

TENDERIZER

The present invention relates to a tenderizer, especially for butchers' meat, comprising:
- a tray to receive a piece of meat to be tenderized,
- a movable device having support means for a grid which is intended to immobilize and hold the piece of meat on the tray during the tenderizing operations, inter alia during the raising of the knives, and tenderizing knives intended to interact with the abovementioned grid and mounted on a movable support.

Various tenderizers of the abovementioned type are already known which all have the major drawback of having elements which come into contact with the piece of meat to be tenderized, some of which are fixed to the tenderizer, either permanently or by means necessitating tooling which the user does not generally have available, and which are therefore much more difficult to clean than the removable elements of the tenderizer and impossible to sterilize.

The object of the invention is to overcome this drawback and to provide a tenderizer in which, on the one hand, the number of elements in contact with the pieces of meat to be tenderized is limited and, on the other hand, these elements can be easily dismantled without the aid of tooling.

To this end, according to the invention, the aforementioned device and the grid which is associated therewith are arranged so that only the face of the grid turned towards the abovementioned tray comes into contact with the piece of meat to be tenderized and the grid is mounted in a removable manner on the support means which associate it with said device.

According to an advantageous embodiment of the invention, the support means for the grid comprise two parallel uprights, one bearing piece, such as a shoe, being fixed at the end of each of the uprights which is closest to the grid and upon which bearing piece the grid bears and is fixed, in order to extend substantially parallel to the tray, with the aid of temporary linking means.

According to a particularly advantageous embodiment of the invention, the grid comprises a removable and undeformable frame, the face of each of the shoes turned towards the tray advantageously being totally covered by the aforementioned frame.

Other details and particularities of the invention will emerge from the description of the drawings which are appended to the present document and which illustrate, by means of nonlimiting examples, a particular embodiment of the tenderizer according to the invention.

In the various figures, the same reference notations designate identical or similar elements.

Figure 1:
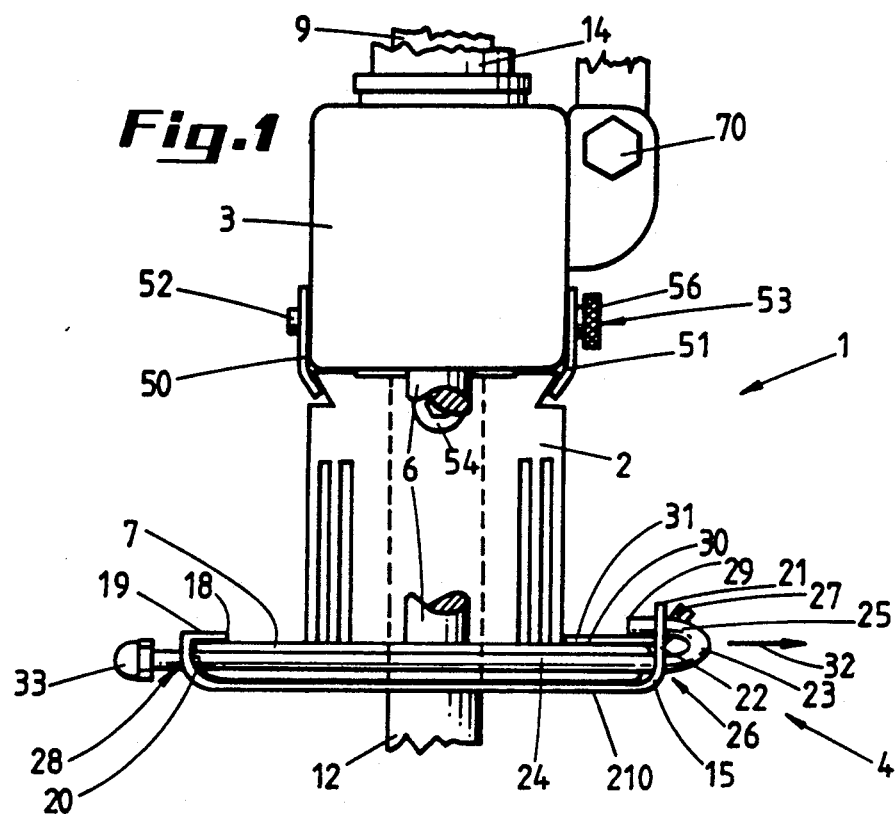
FIG. 1 is a diagrammatic side elevation, in partial cutaway, of the tenderizer according to the invention.

The tenderizer according to the invention and illustrated in the drawings is designated overall by the reference 1. This tenderizer 1 generally comprises a tray (not shown) upon which a piece of meat (not shown) to be tenderized is placed, the plate usually being easy to detach from the tenderizer in order to be cleaned and sterilized.

The tenderizer 1 also comprises tenderizing knives 2 fixed for example under a movable support 3, the latter being able to be activated in a descending movement to embed the knives 2 in the piece of meat to be tenderized or in a raising movement to remove the knives 2 therefrom. The movable support 3 is guided for example (FIG. 4) by two columns 12 which are vertical and perpendicular to the tray and connected to one another by a strut 13.

In order, inter alia, to hold the piece of meat on the tray during the raising of the movable support 3, it is usual to place, between the knives 2, bars forming a grid 4 which bears on the piece of meat, during the descent of the movable support 3, before the knives 2 enter the piece of meat and which leaves the latter after these same knives 2 have come out of said piece of meat.

In order to guide and control the grid 4 starting for example from the movements of the movable support 3, a movable device 8 known per se which has support means 5 (FIG. 4) for said grid 4 is provided, these support means 5 being represented in the present example in the shape of two parallel uprights 6 (FIGS. 1 to 4) which each advantageously comprise, according to the invention, a shoe 7 fixed at their lower end in order to constitute an adequate bearing and a fixing surface for the grid 4. The uprights 6 may be connected together by a cross-member 9 and slide in guide bushes 10 arranged in the movable support 3. The two ends of the cross-member 9 may each enter an annular groove of a known locking and stop ring 14 sliding along a corresponding column 12. The position of the rings 14 in FIG. 4 corresponds to the rest position of the tenderizer 1, the grid 4 not being in contact with the piece of meat. The uprights 6 are further advantageously parallel to the columns 12.

The link between the cross-member 9 and the uprights 6 is advantageously produced by pinching the latter in order to allow for example adjustment of the distance between the tray and shoes 7 by freeing one or both uprights 6 and sliding them across the cross-member 9.

According to the invention, the grid 4 is mounted in a removable manner under the uprights 6, in a fashion which is described hereinbelow.

In the raised position under the uprights 6, under the shoes 7 with a view to tenderizing, according to the invention, the grid 4 extends between the piece of meat to be tenderized and any constituent piece of the movable device 8 so that only the lower face of the grid 4 comes into contact with said piece of meat. To this end, the grid 4 extends, for example, over the entire lower surface of the shoes 7 and if necessary beyond this surface. Thus, inter alia, the uprights 6 and the shoes 7 remain distanced from the piece of meat. In this manner, during cleaning and/or sterilization, when the grid 4 is detached from the support means 5 it can be ensured that no other element of the movable device 8 which cannot be dismantled from the tenderizer 1 without using adequate tooling needs to undergo separate cleaning.

According to the invention, the grid 4 is fixed to the shoes 7 by temporary link means one embodiment of which is described herebelow.

The grid 4 of the tenderizer according to the invention comprises a removable and undeformable frame 15, for example made from stainless steel suitable for the food industries and for the aforementioned cleaning and sterilization operations. In the case of the embodiment described, the two lateral sides 16 of the frame 15, which is advantageously rectangular and mounted in the tenderizing position, each cover the lower surface of the corresponding shoe 7 at least completely in order to prevent contact with the piece of meat to be tenderized.

Figure 3:
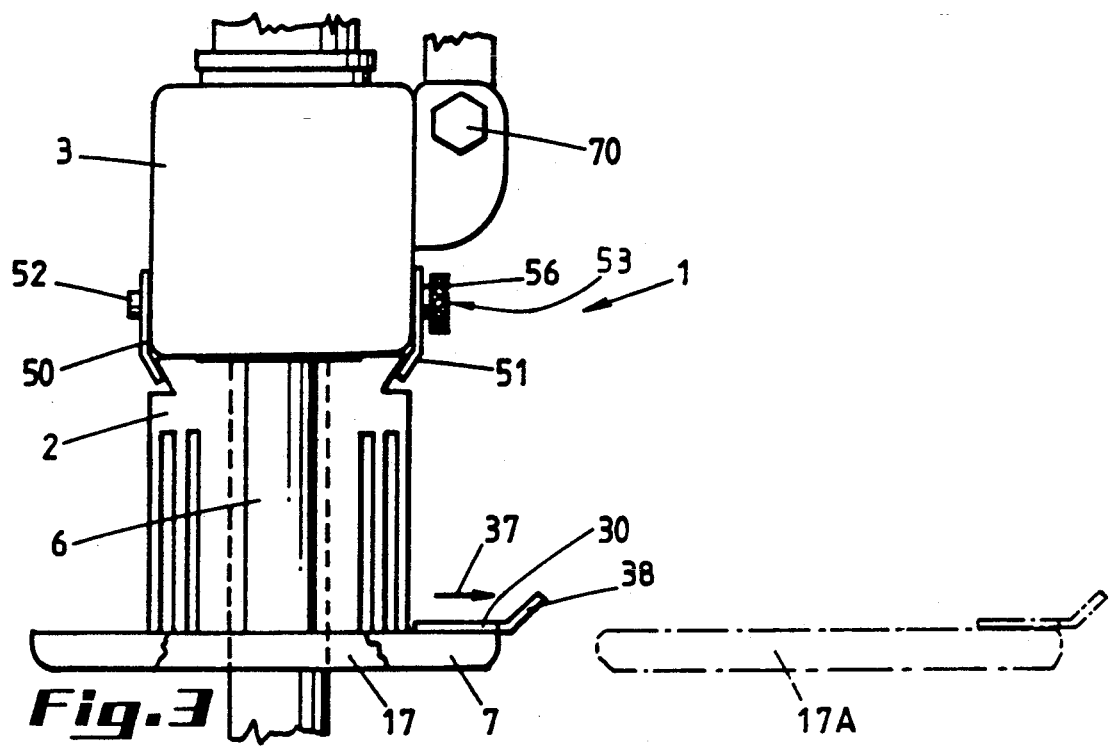
FIG. 3 illustrates, in partial cutaway, the dismantling of the bars of the grid according to the invention, the grid being represented in solid lines in the tenderizing position and in dot-and-dash lines in the position disengaged from the tenderizer.
Figure 4:
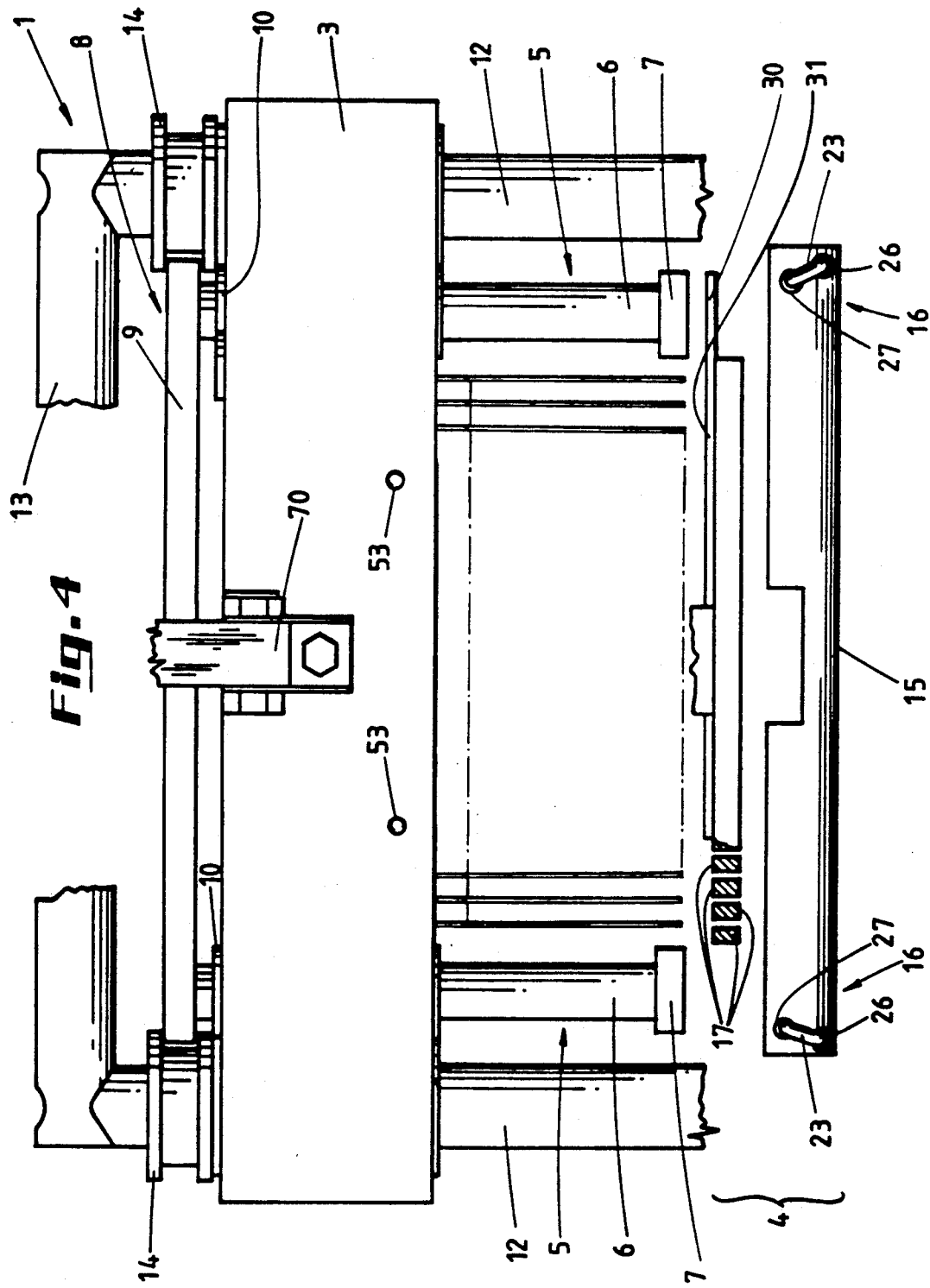
FIG. 4 shows in a diagrammatic front view, in partial cutaway, the tenderizer according to the invention, the grid being withdrawn from the shoes and dismantled and the removable knife-fixing flange being removed.

Usually, the grid 4 comprises bars 17 produced from a synthetic material in order to avoid premature wear of the knives 2 which pass between these bars 17 and which can come into contact with them (see FIGS. 3 and 4).

For linking the grid 4 to the shoes 7, the frame 15 comprises, for example, in the vicinity of one of its longitudinal edges 18, fastening means produced by folding the frame 15 substantially parallel to said longitudinal edge 18 in such a fashion as to present an edge 19 folded over on the upper face of each shoe 7 when the frame 15 is in the tenderizing position. This edge 19 may advantageously be continuous from one shoe 7 to the other and has a fold bottom 20.

One end of each bar 17 may be arranged to be able to be housed between the edge 19 and a solid portion of the frame 15 consecutive to the edge 19 and which is situated under the shoes 7 and extends from one to the other of the latter. Thus, the bars 17 are fixed by one of their ends to the frame 15 by a linking means which is of a piece with that which fixes the grid 4 to the shoes 7 in a removable manner, this linking means being carried by the frame 15.

For linking the grid 4 to the shoes 7 on the side of the other longitudinal edge 21 of the frame 15, the latter is folded in the vicinity of this edge 21 in order to form a projection 22 above the shoes 7 when the frame 15 is in the tenderizing position. This projection 22 is advantageously arranged at right angles with respect to the face 210 of the frame 15, which may come into contact with the piece of meat. This projection 22 is formed at a distance such that for one end of a shoe 7 in the fold bottom 20, the projection 22 is substantially against the other end of the same shoe 7 in order thus to locate the frame 15 with respect to the shoes.

For each shoe 7, a sliding element 23 formed by a stem bent into a U with unequal branches 24 and 25 passes through the projection 22 via two piercings 26 and 27. The piercing 26 closest to the face 210 is arranged so that the long branch 24 can pass along the outer lateral face of the corresponding shoe 7 and pass through a hole 28 in the fold bottom 20 in order to emerge therefrom opposite the shoe 7 with one of its ends, for example a threaded end provided with a cap nut 33, in order to prevent this branch 24 from leaving the hole 28. The short branch 25 passes through the projection 22 via a piercing 27 arranged so that this short branch 25 is situated above the corresponding shoe 7 when it is embedded so that its end 29 comes out of the piercing 27 (FIG. 1).

The piercing 27 may be arranged in the projection 22 so that the short branch 25 pressed in according to FIG. 1 is flush with the upper face of the shoe 7. However, in the advantageous embodiment of the invention shown in FIGS. 1 to 4, between the short branch 25 and the upper face of the shoe 7 there is a wing 30 of a support 31 fixed to the bars 17, for example in order to connect the latter and manipulate them as a unit. Due to the wing 30 thus arranged, the same sliding element 23 serves as a simultaneous link for the frame 15 and for the corresponding shoe 7 as well as for the frame 15 and for the set of bars 17 forming the grid 4 proper.

FIG. 4 shows that a sliding element 23 described hereabove may correspond to each shoe 7. FIG. 1 shows that when the grid 4 is in the tenderizing position, fixed to the shoes 7, the cap nut 33 at the end of the long branch 24 is at a distance from the frame 15 chosen such that when the sliding element 23 is moved in the direction of the arrow 32, at the end of travel, the end 29 is inside the piercing 27 (FIG. 2), thus freeing the upper face of the shoe and/or the wing 30.

Preferably, the shoes 7 and the bars 17 have the same length and same thickness so that these elements can be located with respect to one another in the frame 15 in the tenderizing position, between the fold bottom 20 and the projection 22.

Means for locating the grid 4 between the shoes 7 are provided for example by the respective arrangement against the shoes 7 of the bars 17 nearest to said shoes.

One method of dismantling the grid 4 is performed starting from the tenderizing position represented in FIG. 1. By moving the sliding element 23 in the direction of the arrow 32, the frame 15 is freed so that it can be tilted in the direction of the arrow 34 as shown in FIG. 2 and so that the frame 15 can then be pushed in the direction of the arrow 35 of the same FIG. 2 and the edge 19 can thus be disengaged from the top of the shoes 7 and the frame 15 can be moved away as is shown by the arrow 36 and the drawing of the frame in dot-and-dash line at 15A.

The bars 17 and their support 30 may have accompanied the frame 15 during the dismantling described hereabove. The bars 17 may, however, remain held between the knives 2 as illustrated in FIG. 3. In this case, it is merely necessary for example to withdraw the bars in the direction of the arrow 37 with the aid of a handle 38 which is part of the bar support 31. This is illustrated by the bars 17A distanced from the knives 2.

The person skilled in the art can determine the stages for mounting the bars 17 and the frame 15; he will easily notice the advantageous absence of tools for performing these operations.

Figure 2:
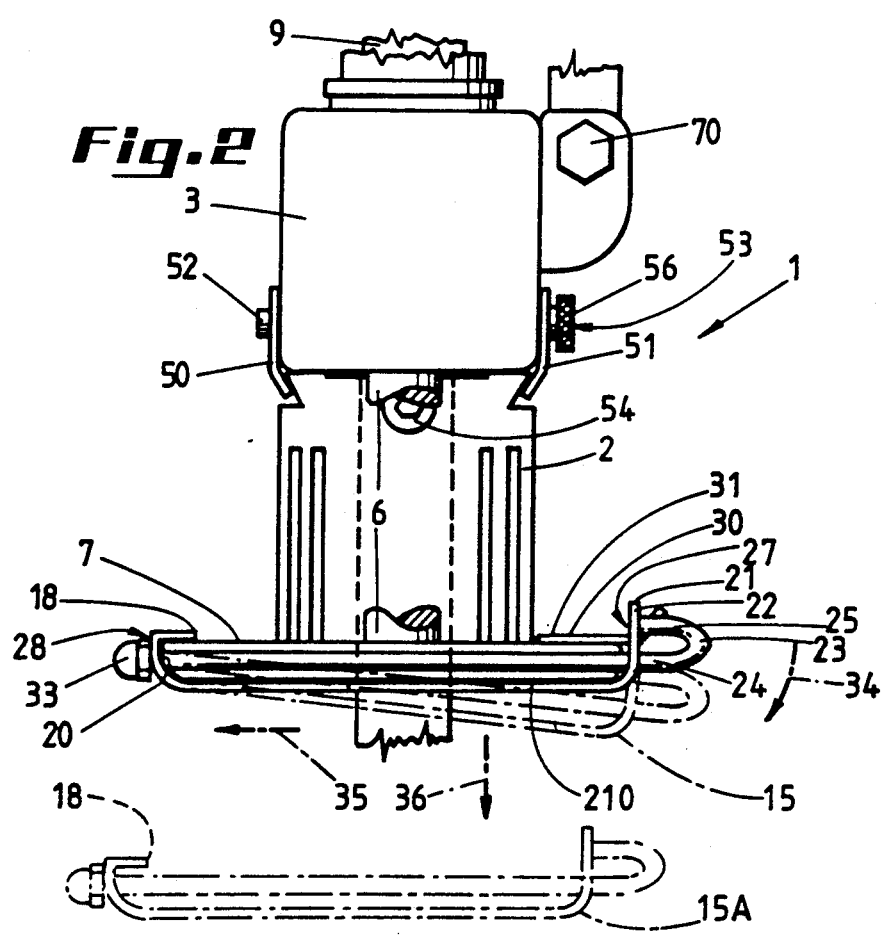
FIG. 2 shows, in dot-and-dash lines, in a view similar to that of FIG. 1, the stages of dismantling of the frame of the tenderizer according to the invention.

According to FIGS. 1 to 3, the tenderizing knives 2 may be fixed to the movable support 3 by clamping between a fixed flange 50 and a removable flange 51 situated on either side of the knives, the fixed flange 50 being held on a vertical face of the movable support 3 for example by screws 52 whose threaded end 53 may emerge via the opposite vertical face of said movable support 3 (FIG. 4). The threaded ends 53 may for example then each receive a knurled nut 56 in order to fix the removable flange 51 to the movable support 3 without tools.

The reference 70 designates the end of a control device, known per se, for moving the movable support 3 during tenderizing.

It must be understood that the invention is in no way limited to the embodiments described and many modifications may be made to the latter without departing from the scope of the present invention.

I claim:

1. A tenderizer, especially for tenderizing butchers' meat, comprising:
   a tray for receiving a piece of meat to be tenderized,
   a movable device (8) having support means (5) for a grid (4) which immobilizes and holds the piece of meat on the tray during tenderizing, and
   tenderizing knives (2) for interacting with the grid (4) and mounted on a movable support (3),
   wherein the movable device (8) and the grid (4) associated therewith are arranged so that only a face of the grid (4) turned towards the tray comes into contact with the piece of meat to be tenderized and the grid (4) is removably mounted on the support means (5) associated with said movable device (8) by linking means (23) arranged on a side of the grid (4) turned away from the tray, said linking means being directly actuable by hand to fix the grid (4) to the support means (5) or to separate the grid from the support means (5).

2. The tenderizer as claimed in claim 1, wherein the support means (5) for the grid (4) comprise two parallel uprights (6), a shoe (7) being fixed at an end of each of the uprights (6) closest to the grid (4) and upon which shoes the grid (4) bears and is fixed to extend substantially parallel to the tray, with the aid of the linking means (23).

3. The tenderizer as claimed in claim 2, wherein the grid (4) comprises a removable and undeformable frame (15).

4. The tenderizer as claimed in claim 3, wherein a face of each of the shoes (7) turned towards the tray is covered by the frame (15).

5. The tenderizer as claimed in claim 3, wherein the means (23) for linking the grid (4) to the shoes (7) is carried by the frame (15).

6. The tenderizer as claimed in claim 3, wherein said grid (4) further comprises means (23) for linking the grid (4) to the frame (15), said linking means being carried by the frame.

7. The tenderizer as claimed in claim 6, wherein the means (23) for linking the grid (4) to the frame (15) and the means for linking the grid (4) to the shoes (7) are formed of a single piece.

8. The tenderizer as claimed in claim 7, wherein the means (23) for linking the grid (4) to the shoes (7) and for linking the grid (4) to the frame (15) comprise fastening means (19), provided on the frame (15) in the vicinity of one of the edges (18) of the frame for interacting with at least one projection (22) extending along the edge (21) of the frame (15) opposite an edge of the frame carrying the fastening means (19) for bearing on at least one shoe (7), at least one sliding element (23) being supported and guided in the at least one projection (22) and arranged to bear on at least one of the shoes (7) in order to immobilize the frame (15) with respect to said shoes (7).

9. The tenderizer as claimed in claim 8, wherein the sliding element (23) bears simultaneously on one of the shoes (7) and on the grid (4) in order to fix the grid to the frame (15).

10. The tenderizer as claimed in claim 1, wherein the grid (4) comprises a removable and undeformable frame (15).

* * * * *